United States Patent [19]

Geller et al.

[11] Patent Number: 4,949,605

[45] Date of Patent: Aug. 21, 1990

[54] CUTTING APPARATUS WITH WORKPIECE ROTATION CONTROL

[76] Inventors: Joseph D. Geller, 52 Prospect St., Topsfield, Mass. 01983; Robert E. LeBlanc, P.O. Box 613, Peabody, Mass. 01960

[21] Appl. No.: 277,190

[22] Filed: Nov. 29, 1988

[51] Int. Cl.[5] .................... B23B 5/14

[52] U.S. Cl. .................... 82/46; 82/90; 82/101

[58] Field of Search .................... 82/46, 47, 48, 90, 101, 82/18

[56] References Cited

U.S. PATENT DOCUMENTS

| | | | |
|---|---|---|---|
| 1,139,322 | 5/1915 | Anderson | 82/90 |
| 2,380,178 | 10/1943 | Howlett | 82/90 |
| 3,292,468 | 12/1966 | Orthey | 82/101 |
| 3,301,109 | 1/1967 | Taverna | 82/101 |
| 3,541,905 | 11/1970 | Mey | 82/101 |
| 3,985,051 | 10/1976 | Brown | 82/101 |
| 4,475,527 | 10/1984 | Kuo | 125/13 |
| 4,488,463 | 12/1984 | Pontarella | 83/13 |
| 4,511,826 | 4/1985 | Kouchi et al. | 318/98 |
| 4,512,224 | 4/1985 | Terauchi | 82/48 |
| 4,748,881 | 6/1988 | Keeling | 82/49 |
| 4,782,728 | 11/1988 | Thatcher | 82/18 |
| 4,848,422 | 7/1989 | Chiantella | 142/37 |

FOREIGN PATENT DOCUMENTS 3310075 9/1984 Fed. Rep. of Germany .

OTHER PUBLICATIONS

The Buehler Ltd. product literature, May 1983.
South Bay Technology, Inc. literature.
Struers, Inc., of Denmark literature Re: Accutom, Nov. 1985.
Struers, Inc., of Denmark literature Re: Accutom-2, Nov. 1985.

*Primary Examiner*—William E. Terrell
*Attorney, Agent, or Firm*—Lahive & Cockfield

[57] ABSTRACT

Apparatus for cutting a workpiece includes a rotatable blade and a rotatable workpiece holder mounted on a pivotable swing arm and rotated in a selected direction by drive elements. The swing arm pivots downward into an engagement position so that the workpiece is urged into resilient contact with the cutting surface, and radial irregularities of the surface of the workpiece are resiliently tracked by the pivoting swing arm.

5 Claims, 2 Drawing Sheets

10 16 38 40 34 26 24 30 28 18 14 28 32 12 22 36 36

CUTTING APPARATUS WITH WORKPIECE ROTATION CONTROL

BACKGROUND OF THE INVENTION

This invention relates generally to cutting apparatus, and, more particularly, relates to apparatus for rapid cutting of metallographic specimens and other workpieces.

Certain prior art cutting devices utilize a fixed chuck for positioning a fixed workpiece at the end of an arm. The arm is then placed in a position of engagement with a rotating circular blade. As the blade cuts through the workpiece an arcuate path is created. The cutting rate typically slows, and heat increases, as the arc length increases. In sensitive materials, excess heat may cause undesirable deformation and phase changes. Moreover, cutting with this type of apparatus may require an operator to manually rotate the workpiece so that a fresh area can be cut. In the course of sectioning a workpiece, many such manual rotations may be required. The resultant section may have an irregular surface, due in part to lateral forces on the blade as the cut progresses.

An example of such a configuration is a low speed saw marketed by Buehler Ltd., which utilizes a sample chuck mounted on a pivoting arm. The sample is pressed into contact with a rotating cutting blade under the force of selectable weights.

It is known that rotating a workpiece during cutting can reduce cutting time and heating by maintaining a substantially constant small contact area between the sample and cutting wheel. Various devices have been constructed for rotating a workpiece during cutting. The following U.S. patents disclose examples of such devices.

| | |
|---|---|
| 1,139,322 | Anderson |
| 2,380,178 | Howlett |
| 3,985,051 | Brown |
| 4,475,527 | Kuo |
| 4,488,463 | Pontarella |
| 4,511,826 | Kouchi |

Anderson discloses a roll trimming machine in which the roll is rotated during cutting.

Howlett discloses a cutting machine in which cutters are rotated by a first spindle, and tubular workpieces are rotated, in contact with the cutters, by a second spindle.

Brown discloses a pipe-cutting device in which workpieces are rotated in the same direction as a cutting wheel, for cutting the circumference of the pipe.

Kuo discloses ingot slicing apparatus in which the workpiece is rotated during cutting.

Pontarella discloses apparatus for stripping wire from an armature, including a circular saw for cutting wire on the armature, and a drive wheel for rotating the armature simultaneously with the cutting of the armature wire.

Kouchi et al discloses cutting apparatus including a first motor mounted on a swing arm for rotating a saw, and a second motor for rotating a workpiece to be cut.

In addition, German Patent No. 3,310,075 discloses a circular saw which rotates the sample in a direction opposite that of the blade, for reducing the contact area between the blade cutting surface and the sample surface.

A dimpling instrument commercially available from South Bay Technology, Inc., of Temple City, California utilizes a rotating chuck for holding and rotating a workpiece, and a dimpling wheel mounted on the end of a pivoting arm. The dimpling wheel can be rotated and lowered into contact with the workpiece for dimpling and polishing.

These prior art cutting devices, however, are not adapted for precise cutting of irregularly shaped workpieces.

In addition, certain conventional cutting devices utilize a rotatable workpiece chuck which is hydraulically advanced against a rotating saw blade. A cutting device of this type is commercially available from Struers, Inc., of Denmark. Cutting devices of this type cannot accommodate larger workpieces. In addition, such devices cannot follow highly irregular shaped workpieces, because the workpiece holder cannot retract when a workpiece "high spot" is encountered. The cut must progress from large radius to small radius, regardless of radial eccentricity of the workpiece.

Accordingly, there exists a need for cutting apparatus which provides reduced cutting time and improved surface finish, even for irregularly shaped or eccentrically mounted workpieces.

It is accordingly an object of the invention to provide cutting apparatus which can cut irregularly shaped or eccentrically mounted workpieces quickly and with excellent surface finish.

It is another object of the invention to provide a cutting apparatus which can cut objects of arbitrary shape with substantially constant contact area during cutting.

It is a further object of the invention to provide a cutting apparatus which can cut irregularly shaped or eccentrically mounted objects with substantially constant normal force.

Other general and specific objects of the invention will in part be obvious and will in part appear hereinafter.

SUMMARY OF THE INVENTION

The foregoing objects are attained by the invention, one aspect of which provides apparatus including a blade having a cutting surface rotatable in a first rotation direction for cutting at least a first surface of a workpiece, and a workpiece holder rotatable in either the first rotation direction or a second rotation direction opposite the first rotation direction.

This aspect of the invention also includes drive elements, coupled to the workpiece holder, for rotating the workpiece holder during cutting, and a pivoting swing arm supporting the workpiece holder and pivoting, due to gravity, so that the workpiece is urged into resilient contact with the cutting surface, wherein radial irregularities of the surface of the workpiece are resiliently tracked by the pivoting swing arm.

The drive elements can be mounted at a selected location on the pivoting swing arm, on either side of the pivot point, for providing a selected gravitational balance of the pivoting swing arm. For example, the drive elements can be mounted so that the pivoting swing arm is urged downward by the weight or balance of the drive elements or counterweight.

The drive elements can include a motor, a resilient drive belt, a drive pulley coupled to the motor, and a driven pulley coupled to the workpiece holder. In particular, the driven pulley can include a plurality of opposed, sealed shoulder bearings; a bearing seal; and shoulder screw elements which couple the workpiece holder to the pivoting swing arm and preload the shoulder bearings by rotation of the shoulder screw elements in a selected direction.

The invention also includes position sensing elements for generating a position signal representative of the position of the workpiece holder, and control elements for terminating cutting at a selected cutting endpoint in response to a selected value of the position signal. This endpoint can be the point at which the axis of rotation of the workpiece holder intersects the surface of revolution defined by the cutting surface of the blade.

Another aspect of the invention provides rotation control elements, mechanically coupled to the workpiece holder, for controlling rotation of the workpiece holder to differ, in either velocity or direction, from the rotation of the cutting surface of the blade. These rotation control elements can be drag elements for applying a selected drag force to the workpiece holder, so that velocity of rotation of the workpiece holder is less than the velocity of rotation of the cutting surface of the blade.

In a further aspect of the invention, constant force support elements support the workpiece holder for urging the workpiece into resilient contact with the cutting surface of the blade with a selected constant force, so that radial irregularities of the surface of the workpiece are resiliently tracked by the constant force support elements. The constant force support elements can include hydraulic actuator elements or resilient energy storage elements for generating the selected constant force.

The invention will next be described in connection with certain illustrated embodiments; however, it should be clear to those skilled in the art that various modifications, additions and subtractions can be made without departing from the spirit or scope of the claims.

BRIEF DESCRIPTION OF THE DRAWINGS

For a fuller understanding of the nature and objects of the invention, reference should be made to the following detail description and the accompanying drawings, in which.

DESCRIPTION OF ILLUSTRATED EMBODIMENTS

Figure 1:
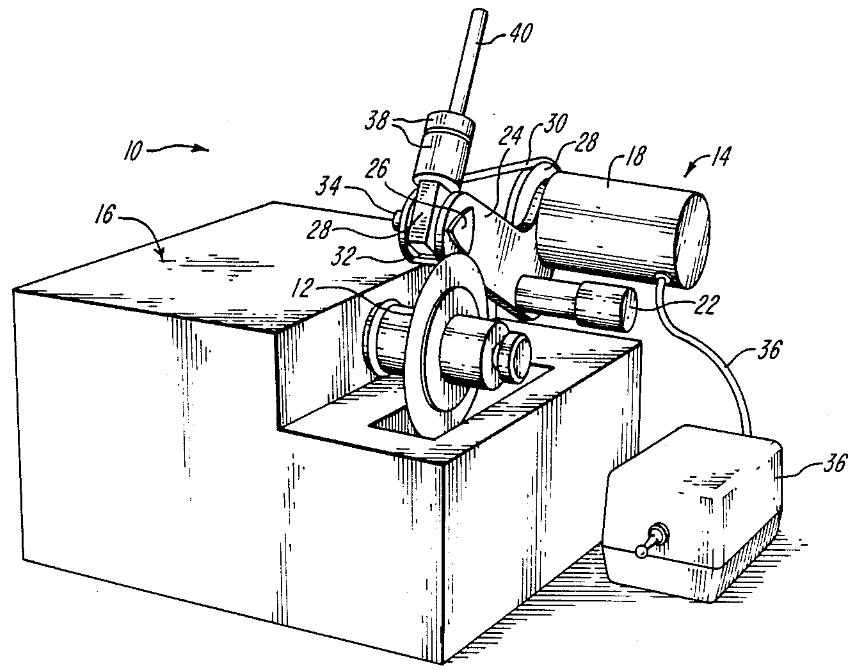
FIG. 1 depicts cutting apparatus in accordance with the invention.
Figure 2:
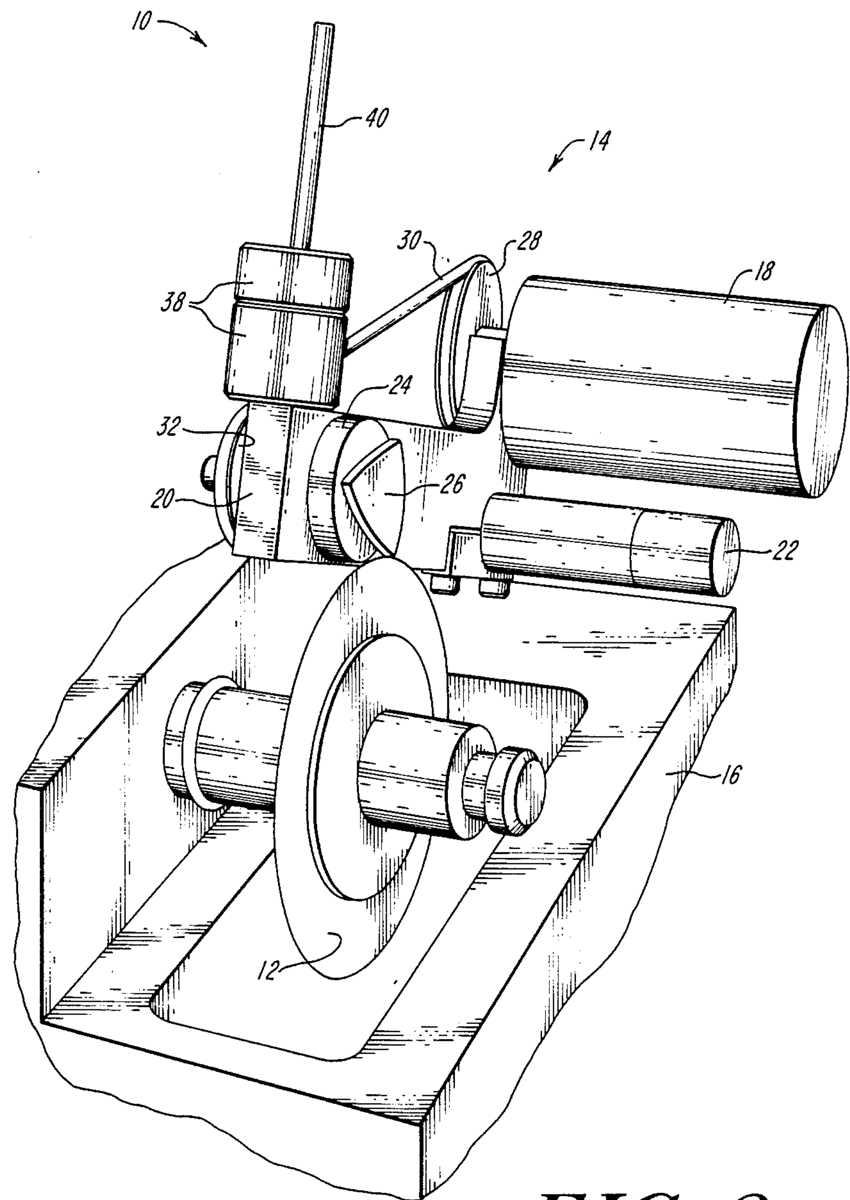
FIG. 2 shows detail of the cutting apparatus of FIG. 1.

Referring to FIGS. 1 and 2, the cutting apparatus 10 includes a saw drive assembly 16, and a workpiece holding and drive assembly 14. The saw drive assembly 16 can be of conventional design and construction, including a saw blade 12. Blade 12 can be a diamond blade, and can be rotated in a cutting direction by a selectable speed motor (#18).

The workpiece holding and drive assembly 14 includes a pivoting swing arm 20 pivotably mounted on the saw drive assembly 16 by means of a conventional, axially adjustable micrometer screw support shaft 22. The support shaft 22 thereby serves as the pivot point of pivotable swing arm 20. The workpiece holding assembly also includes a workpiece holder or chuck 24, to which a workpiece 26 can be bonded, clamped, or otherwise mounted.

In accordance with the invention, the workpiece holder 24 can be rotated at a selected speed in a selected direction. In particular, the selected direction can be the same as that of saw blade 12 or opposite that of saw blade 12. This rotation of workpiece holder 24 is effected by drive elements, including motor 18, mounted at a selected location along pivoting swing arm 20. In the illustrated embodiment of the invention, motor 18 drives a drive pulley 28, which is coupled by a flexible drive belt 30 to a driven pulley 32. Driven pulley 32, in turn, is coupled to workpiece holder 24 through a bearing and shoulder screw assembly 34 described in detail below in connection with FIG. 3.

Alternatively, a chain or other mechanical linkage can be utilized in place of belt 30; or a direct drive configuration, in which workpiece holder 24 is mounted on the shaft of motor 18, can be utilized to drive workpiece holder 24. A resilient drive belt is preferred, however, because it absorbs vibration and shock in the drive system, thereby reducing mechanical jitter and improving the quality of the cut through the workpiece. The flexible drive therefore permits thinner sections to be cut, and provides reduced cutting time.

The direction and velocity of rotation of motor 18, and therefore of workpiece holder 24, is selected and controlled by a conventional motor control assembly 36, which transmits rotation control signals to motor 18 via line 36. Motor 18 can be, for example, a DC gear motor.

In operation, the workpiece 26 is clamped, bonded, or otherwise mounted to workpiece holder 24. The workpiece can be irregularly shaped or eccentrically mounted to workpiece holder 24. Arm 20 is then lowered until the cutting surface of blade 12 contacts the surface of workpiece 26. Axial position of arm 20 and workpiece holder 24 can be adjusted by rotating micrometer screw support shaft 22. Saw drive assembly 16 is activated, causing saw blade 12 to rotate in the cutting direction, and motor 18 is activated, driving pulley 28, belt 30, and pulley 32 and shoulder screw 34 to drive workpiece holder 24 and workpiece 26 at a selected rotational velocity in a selected rotational direction. Thus, the rotating workpiece is placed in contact with a blade which rotates in either the same direction at differing tangential velocities or the opposite direction, thereby effecting a grinding action. Workpiece rotational velocity and direction can be varied in accordance with known engineering practice, to control the sharpness of resulting section contours. Workpiece rotation control is especially advantageous when cutting irregularly shaped workpieces.

Because arm 20 is pivotably mounted to saw drive assembly 16, the arm 20, and thus workpiece holder 24, are free to move vertically to resiliently "track" radial irregularities or eccentricities in the surface of the workpiece 26 while applying a substantially constant selected normal force between workpiece 26 and blade 12. In particular, arm 20, which supports the workpiece 26, is free to move in a vertical arc by the action of the blade pushing against an eccentric region or "high spot" of the workpiece. As a result, the illustrated apparatus cuts irregularly shaped objects with substantially constant pressure. The rotating workpiece is able to rest on the rotating blade throughout the workpiece rotation cycle, because it is free to move in a vertical arc. In this way, the workpiece, whether round or irregular, on-center or eccentric, will have a groove cut into its periphery. This groove will guide the blade to section the workpiece normal to the workpiece rotation axis. The pivoting arm arrangement can accommodate irregular or eccentrically mounted workpieces, thereby permitting cutting and slicing of square, rectangular, triangular or other irregularly shaped workpieces.

The mounting location of motor 18 on arm 20 can be varied to create a selected gravitational balance of arm 20, thereby selecting the normal force which presses workpiece 26 against blade 12. In particular, motor 18 can be mounted on the arm 20 at a location between the driven pulley 32 and the pivot point formed by the micrometer screw support shaft 22. In this configuration, the workpiece 26 is urged into resilient contact with the cutting surface of blade 12 due, in part, to the weight of motor 18, so that radial irregularities of the surface of the workpiece are resiliently tracked by the pivotable swing arm 20. The downward normal force applied at the workpiece end of arm 20 can be increased by mounting selected weights 38 on a shaft 40 coupled to the workpiece end of arm 20. A sliding weight bar mounted along swing arm 20 can also be used to adjust the downward normal force.

Figure 3:
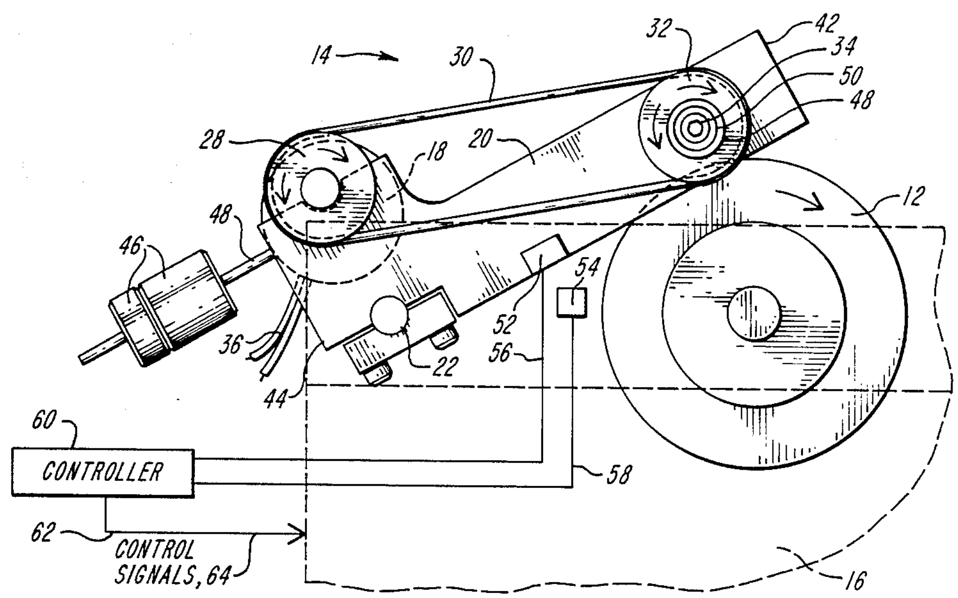
FIG. 3 is a side view of the cutting apparatus of FIG. 1.

Alternatively, as depicted in FIG. 3, motor 18 can be mounted near the distal end 44 of arm 20 —i.e., the end opposite the workpiece end 42. In this configuration, the weight of motor 18 tends to counterbalance the weight of the arm 20 and workpiece holder 24, reducing the downward normal force at workpiece end 42. Counterweights 46, mounted on shaft 48, can also be incorporated into the distal end 44 of arm 20. This arrangement can be advantageously utilized to increase the vibration-damping mass of the workpiece holding assembly 14, while limiting the downward normal force applied at workpiece end 42. Limiting normal force is advantageous when fine surface finish properties are required.

The driven pulley 32 illustrated in FIG. 3 can be rotatably located on pivotable swing arm 20 by a pair of opposed, sealed shoulder bearings 48 disposed in the arm 20 and supporting the faces of pulley assembly 32; by bearing seals 50; and by a threaded shoulder screw 34 which passes through the bearings 48 and engages a cooperating threaded nut (not shown). The bearing seals 50 prevent foreign matter from entering the bearings, and the bearings' shoulder serves to locate the bearings 48 on either side of the pivotable arm 20. Shoulder screw 34 couples the workpiece holder 24 means to the pivotable swing arm 20. Moreover, as the workpiece holder 24 progressively engages the threads of the shoulder screw 34, the bearings 48 are pre-loaded —i.e., free play is eliminated—greatly reducing the bearings' axial runout, thereby improving the surface finish of the cut.

In accordance with the invention, the cutting apparatus can include position sensing elements for generating a position signal representative of the position of the workpiece holder 24 with respect to the blade 12. These position sensing elements, illustrated in FIG. 3, can include electrically conductive plated contacts 52 and 54 mounted at selected points on pivotable swing arm 20 and saw drive assembly 16, respectively. Alternatively, the sensing elements can include conventional pressure-sensitive switches, optical sensing devices, or a potentiometer coupled to the micrometer support shaft 22, for generating analog or digital signals representative of the position of arm 20, and therefore, of workpiece holder 24. These signals can be transmitted along leads 56 and 58 —connected to contacts 52 and 54, respectively—to controller 60. Thus, in response to a position signal value representative of a selected cutting endpoint, controller 60 transmits control signals 64, via line 62, to the saw drive assembly 16, for automatically terminating the cutting process at a reproducible endpoint. This endpoint can be, for example, the point at which the axis of rotation of workpiece holder 24 intersects the surface of revolution defined by the cutting surface of the blade 24. In the embodiment illustrated in FIG. 3, the endpoint can be modified by adjusting the relative positions of contacts 52 and 54, thereby changing the position at which a "closed circuit" position signal value is generated.

As shown in FIGS. 1–3, cutting apparatus according to the invention utilizes a motor 18 for controlling the rotation of workpiece holder 24 by applying a drive force to the workpiece holder 24. Motor 18 can also control the rotation of workpiece holder 24 by applying a selected drag force to the workpiece holder 24, thereby creating a selected differential in the rotational velocity vector between the surface of the workpiece 26 and the cutting surface of the blade 16. This velocity differential can be selected in accordance with known engineering practice, for optimizing cutting rate and surface finish. A selected drag force can also be applied, in accordance with the invention, by a conventional adjustable clutch.

The cutting apparatus illustrated in FIGS. 1–3 utilizes a pivoting swing arm 20 to apply a substantially constant downward normal force for cutting, independent of workpiece surface irregularities or eccentric mounting of the workpiece. Alternatively, hydraulic actuators, or resilient energy storage elements, such as springs, can be utilized in accordance with the invention for generating a substantially constant normal force.

An important feature of the invention is the ability to cut or slit a wide range of soft or hard irregular shaped materials, in a shorter time, in thinner sections, with better surface finish, less heating of the material, and a higher degree of parallelism, than existing techniques permit. In particular, cutting apparatus constructed in accordance with the invention has provided sectioning times reduced by a factor of between 2 and 10, due to the small, constant contact area between the workpiece and the blade. Workpieces as thin as 0.1 mm can be cut with a high degree of uniformity. Because the workpiece rotates, the apparatus permits larger workpieces to be sectioned without repositioning the workpiece on the arm. Additionally, because lateral forces on the blade are negligible, smaller blade stabilizers can be used, resulting in greater saw capacity.

The apparatus can be used for removing the tops of ceramic integrated circuit packages or other device packages of arbitrary shape, by cutting a circumferential groove in the outer surface of the package, and terminating cutting when the blade has nearly penetrated the cavity of the package. A prying tool can then be inserted to fracture the thin layer of remaining material left, thus opening the package while leaving sensitive internal components of the device clean and intact. The apparatus can also be used for sectioning teeth and bone; preparing metallurgical samples; sectioning porous materials for reducing trapped gas volume; grinding grooves in the outside diameter of round or irregular objects; and sectioning printed circuit boards for examination of plated through holes. In many of these applications, the invention renders subsequent polishing unnecessary, because the section surface finish is far superior to that produced by stationary specimen cutting techniques.

It will thus be seen that the invention efficiently attains the objects set forth above, among those made apparent from the preceding description. It will be understood that changes may be made in the above construction and in the foregoing sequences of operation without departing from the scope of the invention. The illustrated single cutting blade, for example, can be replaced by multiple cutting blades. It is accordingly intended that all matter contained in the above description or shown in the accompanying drawings be interpreted as illustrative rather than in a limiting sense.

It is also to be understood that the following claims are intended to cover all of the and specific features of the invention as described herein, and all statements of the scope of the invention which, as a matter of language, might be said to fall therebetween.

Having described the invention, what is claimed as new and secured by Letters Patent is:

1. In apparatus for cutting a workpiece, the apparatus including a blade having a cutting surface rotatable in a first rotation direction for cutting at least a first surface of the workpiece, the improvement comprising workpiece holding means for holding the workpiece, said workpiece holding means being rotatable about an axis of rotation in either of (i) the first rotation direction, so that the first surface of the workpiece moves in a direction substantially opposite that of the cutting surface or (ii) a second rotation direction opposite said first rotation direction, so that the first surface of the workpiece moves in a direction substantially the same as that of the cutting surface, pivoting arm means pivotably supporting said workpiece holding means, for pivoting, due to gravity, so that the workpiece is urged into resilient contact with the cutting surface, at least in part due to gravity, wherein radial irregularities of the surface of the workpiece that are sequentially encountered by the blade due to rotation of the workpiece are resiliently tracked by the pivoting arm means during rotation of the workpiece, so that at least a portion of the cutting surface is in contact with the surface of the workpiece at all times during rotation of the workpiece, regardless of radial irregularities of the workpiece that are sequentially encountered by the blade due to rotation of the workpiece, and variable rotation control means, mechanically coupled to said workpiece holding means, for selectively and variably controlling rotation of said workpiece holding means so that movement of the surface of the workpiece selectively differs in any of velocity or direction from the movement of the cutting surface of the blade.

2. In apparatus according to claim 1, the further improvement wherein said rotation control means includes drag means for applying a selected drag force to said workpiece holding means, so that velocity of rotation of said workpiece holding means is selectively less than the velocity of rotation of the cutting surface of the blade.

3. In apparatus according to claim 1 the further improvement wherein said variable rotation control means is mounted on said pivoting arm means, so that said pivoting arm means and the workpiece are urged downward, due at least in part to the wright of said variable rotation control means.

4. In apparatus according to claim 1 the further improvement comprising position sensing means, coupled to said workpiece holding means, for generating a position signal representative of the position of said workpiece holding means, and control means, in circuit with said position sensing means, for terminating cutting in response to a selected value of said position signal, said selected value being representative of a selected cutting endpoint.

5. In apparatus according to claim 4, the further improvement wherein said control means includes means for terminating cutting when the axis of rotation of said workpiece holding means intersects the surface of revolution defined by the cutting surface of the blade.

* * * * *